(12) United States Patent
Shpak

(10) Patent No.: US 11,239,874 B2
(45) Date of Patent: Feb. 1, 2022

(54) SYSTEM, APPARATUS, AND METHOD FOR PROVIDING WIRELESS COMMUNICATION AND A LOCATION TAG

(71) Applicant: Deeyook Location Technologies Ltd., Tel Aviv (IL)

(72) Inventor: Eran Shpak, Tel Aviv (IL)

(73) Assignee: Deeyook Location Technologies Ltd., Tel Aviv (IL)

( * ) Notice: Subject to any disclaimer, the term of this patent is extended or adjusted under 35 U.S.C. 154(b) by 4 days.

(21) Appl. No.: 16/777,479

(22) Filed: Jan. 30, 2020

(65) Prior Publication Data

US 2021/0242898 A1 Aug. 5, 2021

(51) Int. Cl.
*H04W 72/00* (2009.01)
*H04W 88/06* (2009.01)
(Continued)

(52) U.S. Cl.
CPC .......... *H04B 1/406* (2013.01); *H04L 61/6022* (2013.01); *H04W 64/003* (2013.01); *H04W 72/0453* (2013.01); *H04W 88/06* (2013.01)

(58) Field of Classification Search
CPC .. H04W 72/044; H04W 88/06; H04M 11/022
(Continued)

(56) References Cited

U.S. PATENT DOCUMENTS 5,657,358 A * 8/1997 Panech ................. H04L 1/0007
375/356
5,687,194 A * 11/1997 Paneth .................. H04L 1/1642
375/283

(Continued)

FOREIGN PATENT DOCUMENTS

EP    2194649 A2    6/2010
WO   2005088849 A1   9/2005
(Continued)

OTHER PUBLICATIONS

Efficient baseband modem physical implementation for fixed broadband wireless access networks by Labros Bisdounis Published in : 2016 5th International Conference on Modern Circuits and Systems Technologies (MOCAST) Jun. 2016 (Year: 2016).*

(Continued)

*Primary Examiner* — William D Cumming

(74) *Attorney, Agent, or Firm* — Brooks Kushman P.C.

(57) ABSTRACT

In at least one embodiment, an apparatus for wireless communication is provided. The apparatus includes a transceiver, a dedicated modem, a frequency converter, at least one controller and a bus. The transceiver receives a first wireless signal associated with a first predefined wireless communication standard and a second wireless signal associated with a second predefined wireless communication standard. The dedicated modem is capable of processing the first wireless signal. The frequency converter down converts a second frequency of the second wireless signal. The controller receives data on the second wireless signal and processes the data on the second wireless signal. The bus is configured to divert the data from the second wireless signal from being received at the dedicated modem by directly transmitting the data from the second wireless signal to memory. The controller is further programmed to access the memory for processing the data on the second wireless signal.

16 Claims, 5 Drawing Sheets

(51) Int. Cl.
  *H04B 1/403* (2015.01)
  *H04L 29/12* (2006.01)
  *H04W 64/00* (2009.01)
  *H04W 72/04* (2009.01)

(58) Field of Classification Search
  USPC ......... 455/412.1, 456.3, 414.3, 575.9, 414.1, 455/422.1; 370/353, 401; 375/222, 283, 375/356; 340/7.21
  See application file for complete search history.

(56) References Cited

U.S. PATENT DOCUMENTS

| | | | | |
|---|---|---|---|---|
| 6,411,804 | B1* | 6/2002 | Isomichi | H04M 11/022 340/7.21 |
| 7,499,714 | B2* | 3/2009 | Ki | G07B 15/02 455/456.3 |
| 8,116,836 | B2* | 2/2012 | Ki | G06Q 30/0283 455/575.9 |
| 8,280,355 | B1* | 10/2012 | Jones | G08G 1/0141 455/414.1 |
| 8,576,901 | B2* | 11/2013 | Tat | H04W 88/06 375/222 |
| 8,819,757 | B2* | 8/2014 | Rivera | H04N 21/438 725/131 |
| 9,814,051 | B1 | 11/2017 | Shpak | |
| 10,091,024 | B2* | 10/2018 | Giroud | B61L 27/04 |
| 10,182,315 | B2 | 1/2019 | Shpak | |
| 10,405,161 | B2 | 9/2019 | Mishra et al. | |
| 10,408,482 | B2* | 9/2019 | Ro | G05B 15/02 |
| 10,485,029 | B2* | 11/2019 | Yang | H04W 52/0235 |
| 10,531,289 | B2* | 1/2020 | Zhu | G06F 21/53 |
| 2002/0081999 | A1* | 6/2002 | Isomichi | H04M 11/022 455/412.1 |
| 2009/0080448 | A1* | 3/2009 | Tarra | H04L 65/605 370/401 |
| 2009/0176483 | A1* | 7/2009 | Ki | G07B 15/02 455/414.3 |
| 2011/0051721 | A1* | 3/2011 | Brothwell | H04B 3/54 370/353 |
| 2013/0156081 | A1* | 6/2013 | Tat | H04W 88/06 375/222 |
| 2014/0325575 | A1* | 10/2014 | Rivera | H04N 21/64322 725/110 |
| 2014/0325585 | A1* | 10/2014 | Rivera | H04N 21/438 725/131 |
| 2014/0331267 | A1* | 11/2014 | Rivera | H04N 21/6125 725/110 |
| 2016/0080082 | A1* | 3/2016 | Lemson | H04L 5/0032 398/115 |
| 2016/0231014 | A1* | 8/2016 | Ro | F24F 11/62 |
| 2017/0279636 | A1* | 9/2017 | Giroud | B61L 27/0005 |
| 2018/0263058 | A1* | 9/2018 | Yang | H04L 1/00 |
| 2018/0367989 | A1* | 12/2018 | Zhu | G06F 21/74 |
| 2020/0367240 | A1* | 11/2020 | Sung | H04W 52/028 |
| 2021/0014693 | A1* | 1/2021 | Syed | H04W 16/14 |
| 2021/0204135 | A1* | 7/2021 | Cho | H04W 12/61 |
| 2021/0242898 | A1* | 8/2021 | Shpak | H04L 61/6022 |

FOREIGN PATENT DOCUMENTS

| | | | | |
|---|---|---|---|---|
| WO | WO-2014028247 | A1* | 2/2014 | ........ H04W 74/0816 |
| WO | WO2018165736 | A1* | 5/2017 | |
| WO | WO2018066777 | A2* | 4/2018 | |
| WO | WO-2018066777 | A2* | 4/2018 | ............ H04W 88/06 |

OTHER PUBLICATIONS

Hardware in a loop-a system prototyping platform for MIMO-approaches by M. Stege • F. Schafer • M. Henker • G. Fettweis Published in: ITG Workshop on Smart Antennas (IEEE Cat. No.04EX802) (pp. 216-222) Mar. 2004 (Year: 2004).*

L. Bisdounis, "Effcient baseband modem physical implementation for fixed broadband wireless access networks," 2016 5th International Conference on Modern Circuts and Systems Technologies (MOCAST), 2016, pp. 1-4, doi: 10.1109/MOCAST.2016.7495109. Jun. 2016 (Year: 2016).*

Z. Stamenković, K. Tittelbach, M. Krstić, M. Stojčev and B. Dimitrijević, "Hardware/Software Co-Design of Wireless LAN Transceiver: A Case Study, " Sep. 2019 IEEE 31st International Conference on Microelectronics (MIEL), 2019, pp. 45-52, doi: 10.1109.MIEL.2019.8889653. (Year: 2019).*

International Search Report dated Jul. 2, 2021 for PCT Appn. No. PCT/IB2021/050594 dated Jan. 26, 2021, 16 pgs.

Rademakers, E. et al., "Obtaining real-time sub-meter accuracy using low cost GNSS device", 2016 European Navigation Conference, IEEE, May 30, 2016, 8 pgs.

* cited by examiner

SYSTEM, APPARATUS, AND METHOD FOR PROVIDING WIRELESS COMMUNICATION AND A LOCATION TAG

TECHNICAL FIELD

Aspects disclosed herein generally relate to system, apparatus, and method for providing wireless communication. Additional embodiments disclosed herein also generally relate to a system, apparatus, and method and for providing a location tag. These aspects and others will be discussed in more detail herein.

BACKGROUND

U.S. Pat. No. 10,182,315 to Shpak (hereafter the '315 patent) discloses a method for signal processing that includes receiving at a given location, at least first and second signals transmitted, respectively, from at least first and second antennas of a wireless transmitter. The at least first and second signals encode identical data using a multi-carrier encoding scheme with a predefined cyclic delay between the transmitted signals. The received first and second signals are processed, using the cyclic delay, in order to derive a measure of a phase delay between the first and second signals. Based on the measure of the phase delay, an angle of departure of the first and second signals from the wireless access point to the given location is estimated.

U.S. Pat. No. 9,814,051 also to Shpak (hereafter the '051 patent) discloses a method for signal processing. The method provides, among other things, receiving at a given location at least first and second signals transmitted, respectively, from at least first and second antennas of a wireless transmitter, the at least first and second signals encoding identical data using a multi-carrier encoding scheme with a predefined cyclic delay between the transmitted signals and processing the received first and second signals, using the cyclic delay, in order to derive a measure of a phase delay between the first and second signals. Based on the measure of the phase delay, the method provides estimating an angle of departure of the first and second signals from the wireless transmitter to the given location.

SUMMARY

In at least one embodiment, an apparatus for wireless communication is provided. The apparatus includes a transceiver, a dedicated modem, a frequency converter, at least one controller and a bus. The transceiver is configured to receive a first wireless signal from a first wireless transmitter associated with a first predefined wireless communication standard at first frequency and to receive a second wireless signal from a second wireless transmitter associated with a second predefined wireless communication standard at a second frequency. The dedicated modem is capable of processing the first wireless signal. The frequency converter is configured to down convert the first frequency of the first wireless signal or the second frequency of the second wireless signal. The controller is programmed to receive data on the second wireless signal and to process the data on the second wireless signal associated with the second predefined wireless communication standard after down converting the second frequency of the second wireless signal. The bus is configured to divert the data from the second wireless signal from being received at the dedicated modem by directly transmitting the data from the second wireless signal to memory. The at least one controller is further programmed to access the memory to process the data on the second wireless signal associated with the second predefined wireless communication standard.

In at least another embodiment, a computer-program product embodied in a non-transitory computer readable medium that is programmed for wireless communication is provided. The computer-program product includes instructions to receive a first wireless signal from a first wireless transmitter associated with a first predefined wireless communication standard at first frequency and to receive a second wireless signal from a second wireless transmitter associated with a second predefined wireless communication standard at a second frequency. The computer-program product further includes instructions to down convert the first frequency of the first wireless signal or the second frequency of the second wireless signal. The computer-program product further includes instructions to process, via a dedicated modem, the first wireless signal and to process, via at least one controller, data on the second wireless signal associated with the second predefined wireless communication standard after down converting the second frequency of the second wireless signal. The computer-program product further includes instructions to divert the data on the second wireless signal, via a bus, from being received at the dedicated modem by directly transmitting the data from the second wireless signal to memory and to access the memory to process the data on the second wireless signal associated with the second predefined wireless communication standard.

In at least another embodiment, a method for wireless communication is provided. The method includes receiving a first wireless signal from a first wireless transmitter associated with a first predefined wireless communication standard at first frequency and receiving a second wireless signal from a second wireless transmitter associated with a second predefined wireless communication standard at a second frequency. The method further includes down converting the first frequency of the first wireless signal or the second frequency of the second wireless signal and processing, via a dedicated modem, the first wireless signal based on the first predefined wireless communication. The method further includes processing, via at least one controller, data on the second wireless signal associated with the second predefined wireless communication standard after down converting the second frequency of the second wireless signal and diverting the data on the second wireless signal, via a bus, from being received at the dedicated modem by directly transmitting the data from the second wireless signal to memory. The method further includes accessing the memory to process the data on the second wireless signal associated with the second predefined wireless communication standard.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
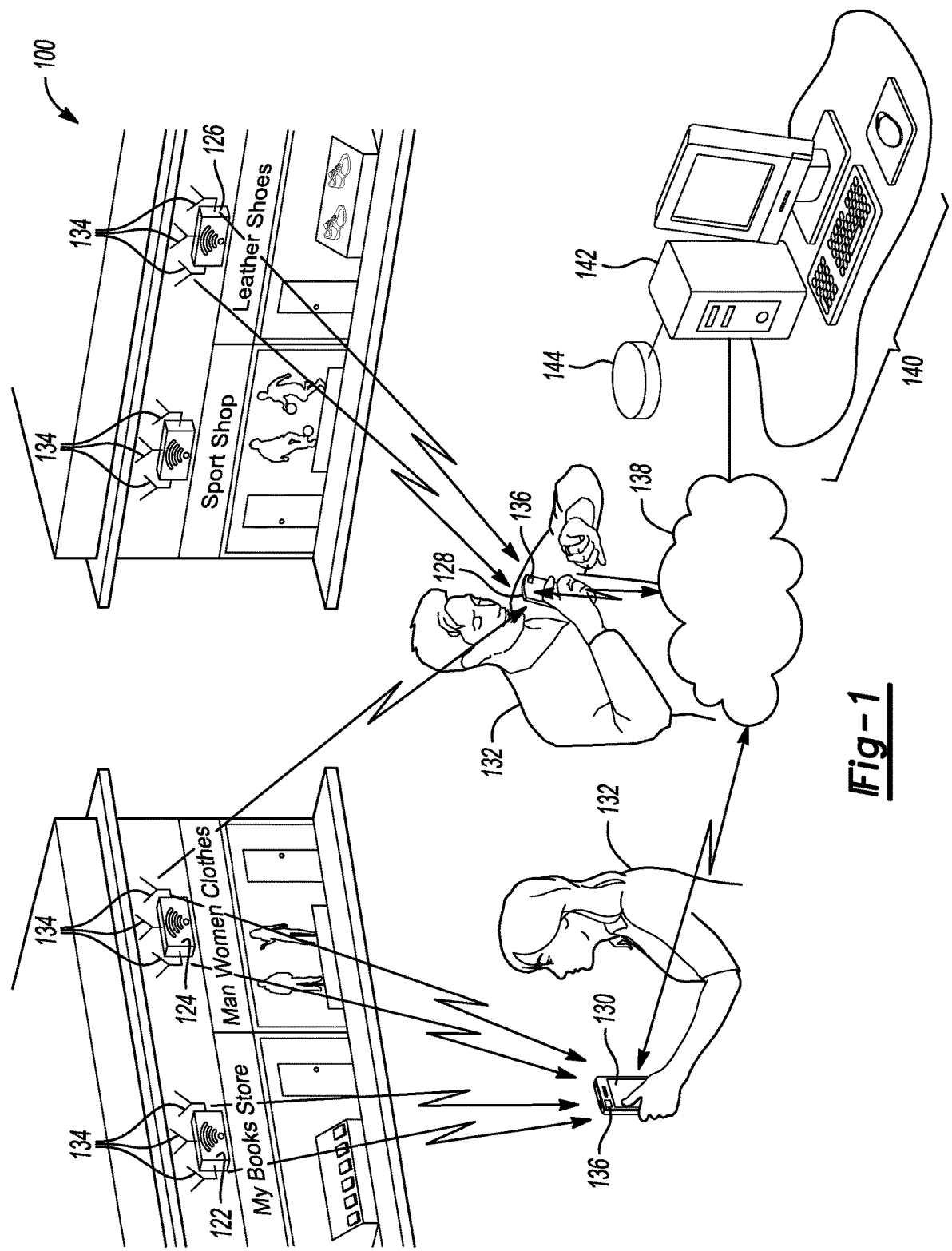
FIG. 1 depicts an example of a wireless communication system in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that at least one controller as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, the at least one controller as disclosed herein utilize one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The disclosed controller(s) also include hardware-based inputs and outputs for receiving and transmitting data, respectively from and to other hardware-based devices as discussed herein.

The disclosed embodiments may provide wireless communication and a wireless location tag solution. The wireless location tag may correspond to a mobile device and/or a wireless transceiver that is arranged for attachment to an object. The location tag may transmit information corresponding to the location of object to one or more access points and/or the at least one server. The wireless location tag solution may involve estimating a location of an access point in wireless communication setting by utilizing MODEM chips with little to no change to its corresponding hardware. Such MODEM chips may be utilized for various wireless communication protocols such as for example, Long-Term Evolution (LTE), 5G, etc. The disclosed apparatus may utilize a radio frequency (RF) based front-end receiver (or transceiver) to digitize a received analog signal at, for example, the 1.9 GHz unlicensed band, and/or alternatively at a different frequency band such as at, for example, the 2.4 GHz unlicensed band. The discloses apparatus may bypass a hard-coded based MODEM that may be based for one protocol (e.g. LTE) and may implement another such as for example, a WiFi MODEM along with additional signal processing that may be required for locationing. The apparatus may be needed to provide accurate location information, other than global positioning system GPS implementations or other LTE based solutions that may be used in existing tag installations. With new tag installations that are void of GPS hardware, or for implementations were GPS and/or LTE is not available or inaccurate, it may be possible to extend tag battery life by reducing power consumption and to preserve engineering cost and time involved in designing hardware that involves locationing. The disclosed approach may also enable field upgrades of the existing locationing algorithms for utilization in protocol innovations involving, for example, 5G, WiFi-6 etc., to provide both a locationing sensor in one frequency band and a required backhaul communication channel on a different channel. The disclosed approach may also provide time sharing on a single hardware MODEM to thereby reduce cost by sharing resources such as CPU and memory. Such a sharing of resources may provide a smaller fingerprint for hardware while reducing overall power consumption and reducing an antenna area which improves the mechanical design.

The noted disclosure may solve various issues that relate to hardwired-wireless MODEM inflexibility. For example, the MODEM may be designed or tailored for a specific protocol purpose for wireless communications. The wireless medium and the protocol used for locationing may be independent of the wireless medium and the protocol used for communications. Generally, the locationing signal as provided by one or more access points should have ideal propagation qualities and may comprise multiple emitters from different locations. Additionally, the locationing signal may be packet based, but not necessarily utilize isochronous streaming that may be used in wireless communications. The location emitters for access points may be deployed on premises for services other than location and very typically for communication. The emitters employed in this embodiment for locationing may be potentially deployed by different service providers, potentially unaware of each other. The location emitters may be redundant, potentially of limited availability in time. The emitters employed for locationing may be deployed in frequency bands chosen for the communication.

The MODEM in the mobile device (or location tag) may also be designed for wireless communications. Aspects disclosed herein may employ a hardware tag with no change to the hardware itself to provide for an accurate wireless location tag (i.e., accurately detect the location of one or more access points). On the other hand, the communications infrastructure may not require emitter redundancy, may overcome extreme multipath conditions using channel coding and spatial coding which may typically limit the availability of service to registered paying customers. Such limited availability may cause foreign services for premises to be unavailable for wireless communications (e.g., using authentication techniques). In general, one use of wireless communication and the desired use of locationing beg decoupling across infrastructures across protocol and across frequency band through the utilization of a unified (and unchanged for locationing) hardware. The present disclosure may solve, among other things, the notion of inflexibility by implementing the location processing in software (i.e., that is executed by hardware), by time sharing the wireless front-end between the original wireless MODEM and a software location method (as executed on any one or controllers (or central processing units (CPUs) as set forth herein) with alternating front-end frequency channels between the hardware communication MODEM and locationing algorithm. The hardware interface between the wireless front-end and the hardware communication MODEM block may correspond to a bus, such as for example, an Advanced Microcontroller Bus Architecture (AMBA), which may be available to the CPU that executes the locationing software. Hence, by alternating a digitizer output between the hardware MODEM input and CPU memory, it is possible to utilize using existing chips or circuits. Further, since the locationing function as performed by mobile devices may depend on an isochronous reception of Beacon packets, at predictable epochs, the location algorithm may operate at optimal time intervals of for example 5 ms every 100 ms. This aspect may overcome an inherent weakness of software vs. hardware in terms of computational power.

FIG. 1 depicts an example of a wireless communication system 100 in accordance to one embodiment. For example, FIG. 1 may illustrate and indoor or urban environment, in which multiple access points 122, 124, 126 are deployed, often by different Wireless Local Area Network (WLAN) or LTE proprietors independently of one another. It is recognized that the number of access points 122, 124, 126 may vary. Signals from the access points 122, 124, 126 may be received by mobile devices 128, 130 that are operated by users 132 who are free to move around within environment. Again, it is recognized that the number of mobile devices 128, 130 within the illustrated environment may vary. While not expressly illustrated in FIG. 1, it is recognized that the mobile device 128 may correspond to any one or more of a cellular phone, tablet, laptop, wireless tag device or any other devices that may provide location tag functionality. In one example, the mobile device 128, 130 may be attached to an object (e.g., and physical object including a person or animal) (not shown) to provide information indicative of a location of the object. Each mobile device 128, 130 generally includes a MODEM or other apparatus for enabling wireless communication with the various access point 122, 124, 126 in the environment.

Assuming, for example, that the access points 122, 124, 126 in system 100 are compliant with the 802.11n standard (e.g., WIFI based standard), each access point 122, 124, 126 may include two or more antennas 134. The mobile devices 128, 130 may each be assumed to have a single, omnidirectional antenna 136 to communicate with the access points 122, 124, 126. In general, the mobile devices 128, 130 may process signals received from antennas 34 to determine the location of any one or more of the respective access points 122, 124, 126.

The mobile devices 128, 130 may associate with any one or more of access points 122, 124, 126 for purposes of Internet communications. Alternatively or additionally, the mobile devices 128, 130 may access the Internet via a cellular network or other connection. In any case, the mobile devices 128, 130 may communicate access point identification and/or a location of the one or more access points 122, 124, 126 (i.e., regardless of security layers they apply and enforce) via a network 138 to a mapping server 140. The mobile devices 128, 130 may also utilize information pertaining to a Long Training Field (LTF) from any one or more of the access points 122, 124, 126 to determine an angle of departure for antennas of any one or more of the access points 122, 124, 126. In one example, the '315 patent and '051 patent disclose, but not limited to, the manner in which such information is used to determine an angle of departure for antennas of the various access points 122, 124, 126. However, the aspects as disclosed herein may provide, but not limited to, an apparatus and method for ascertaining and providing such LTF information to determine the angle by utilizing a time stamping algorithm along with a hardware diversion technique to obtain the LTF information. In one example, the disclosed apparatus and/or method may employ processing techniques that may be used from one wireless protocol such as for example, WIFI to bypass processing techniques employed for another wireless communication protocol such as for example, LTE. These aspects will be discussed in more detail below.

Turning back to FIG. 1, the mobile devices 128, 130 may communicate their current location coordinates to a mapping server 140, as derived, for example, from GPS signals or from known locations of access points 122, 124, 126 or base stations (not shown) that are provided by the server 140. This information may be collected and reported autonomously and automatically by a suitable application program ("app") that is executed in hardware (e.g., electronic circuitry, controller, etc.) on the mobile devices 128, 130. The server 140 typically comprises a general-purpose computer, comprising a programmable processor 142 and a memory 144. The functions of the server 140 that are described herein are typically implemented in software running on a processor 142, which may be stored on tangible, non-transitory computer-readable media, such as optical, magnetic or electronic memory media.

For example, based on the angle-of-departure information, access point identification, and location coordinates communicated over network 138 by the mobile devices 128, 130; the processor 142 may build a map of access point locations and orientations in the memory 144. As a greater number of users 132 download the application program and convey information to the server 140, the map may grow in both geographic extent and accuracy of the access point data, by a process of bootstrapping from an initial base of seed information. Based on the map, the server 140 may also provide location and navigation information to users 132 via the application program when executed on their respective mobile devices 128, 130 based on the access point signals received by the mobile devices 128, 130 at any given time.

Figure 2:
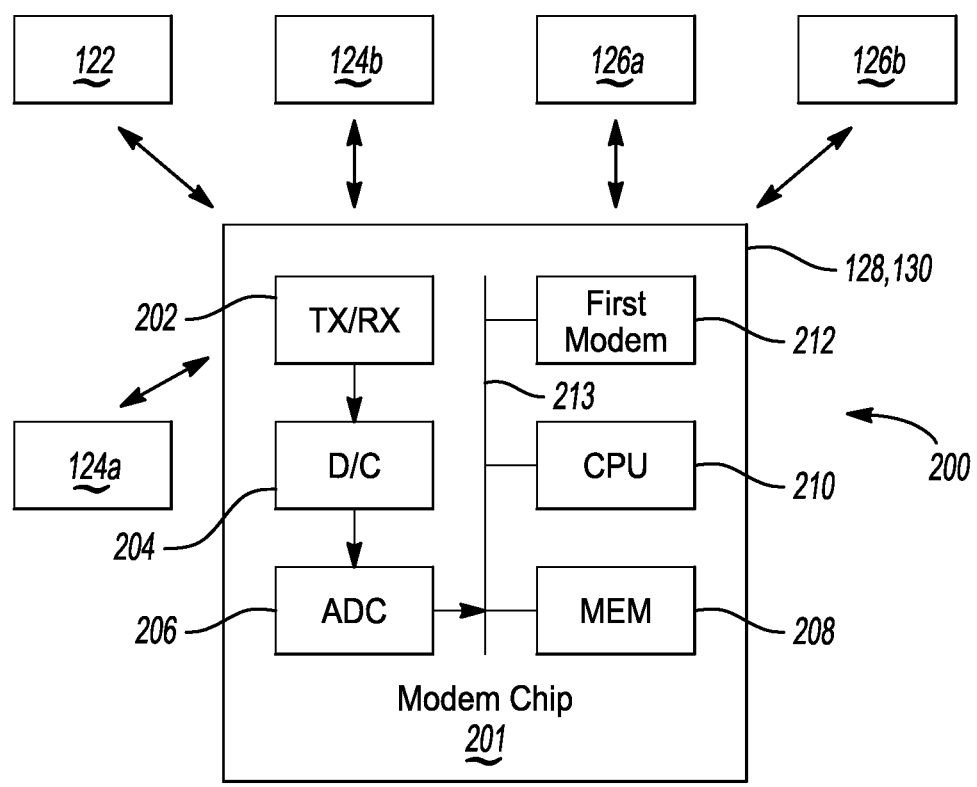
FIG. 2 depicts an apparatus that may be implemented in the wireless communication system of FIG. 1 to provide a location tag in accordance to one embodiment.

FIG. 2 depicts an apparatus 200 that may be implemented in the wireless communication system 100 of FIG. 1 to provide a location tag in accordance to one embodiment. For purposes of description, it can be assumed that the access point 122 may communicate with the mobile device 128 (or 130) (hereafter "128" for brevity) over a first communication network (e.g., WIFI network A, channel 1 @ 2.4 GHz), that the access points 124a and 124b may communicate with the mobile device 128 over a second communication network (e.g., WIFI network B @ channel 6 @2.4 GHz), that the access point 126a may communicate with the mobile device 128 over a third communication network (e.g., LTE network A @ 1.9 GHz) and that the access point 126b may communicate with the mobile device 128 over a fourth communication network (e.g., LTE network B @ 1.9 GHz).

The mobile device 128 generally includes a modem 201 (or modem chip (e.g., integrated chip (IC), etc.)). The modem 201 generally facilitates converting analog information as received from the access points 122, 124, 126 into digital information. The modem 201 includes a transceiver 202, a downconverter 204, an analog to digital converter (ADC) 206, memory 208, and at least one central processing unit (CPU) (or at least one controller) 210. A dedicated modem chip 212 (or sub-modem) may also be provided on the modem 201. In this case, the dedicated modem chip 212 may correspond to, for example, an LTE based modem to enable communication with the various LTE based networks or associated access points. A bus 213 facilitates the transmission of data between the ADC 206, the memory 208, and the controller 210. In one example, the bus 213 may be an Advanced Microcontroller Bus Architecture (AMBA) bus that may be employed in a system-on-a-chip (SoC) design.

It is recognized that the modem 201 generally facilitates communication, for example, any number of communication networks (e.g. WiFi and LTE based networks). At least two spatially overlapping network types (e.g., a first LTE network and a second LTE network) that are owned by different service providers that the mobile device 128 has no service contracts with (i.e., needs a contract with the LTE operator of a backhaul), hence may not interact with. In addition, a large collection of foreign WiFi networks, the mobile device 128 has no access to, may be spectrally spread across, for example, the ISM 2.4 GHz band. It may be desirable for the mobile device 128 to process information as received via the first or second communication network (e.g., WiFi) as opposed to the third or fourth communication network (e.g., LTE) for providing signal components such as Long Training Field (LTF) information to the controller 210 for the purpose of, but not limited to, determining an angle of departure for first and second signals that are transmitted from any one or more of the access points 122, 124, 126.

Assuming, as stated earlier, that the dedicated modem 212 generally corresponds to an LTE based modem, it may be desirable to divert (or bypass) the flow or transmission of information as received from any of the access points 122, 124, 126 at predetermine instances from being received at the dedicated modem 212. For example, the apparatus 200 may process data in the WiFi format to provide locationing functionality. The apparatus 200 may enable processing the data in the WiFi format without any hardware modifications. Specifically, the apparatus 200 may utilize various aspects of the hardware that may not have been used for the purpose of performing such processing in WiFi. This will be discussed in more detail below.

The apparatus 200 may hop between WiFi and LTE processing and generally sets out to provide a location tag utilizing the WiFi format (or with data that is transmitted via the access points 122, 124, 126 in the WiFi format). In general, the downconverter 204 is protocol agnostic and can receive signals in either the WiFi or LTE format. The downconverter 204 may be tuned to a center frequency of the received signal of interest which may be different between LTE licenses and WiFi {e.g., unlicensed, ISM}. Generally, the controller 210 may administer the downconverter 204 and set the center radio frequency (RF) frequency as required. Normally, the downcoverter 204 is tuned to receive an LTE carrier signal from the access points 122, 124, 126. Aspects of the disclosure generally provide for a reprogramming of the controller 210 with instructions, that when executed by the controller 210 provide for a reprogramming of various hardware registers of the down converter 204. This may entail re-tuning the downcoverter 204 to the corresponding WiFi channel in the 2.4 GHz band. Additional parameters may be re-tuned in response to the controller 210 executing the instructions. For example, such additional parameters may include, but not limited to, radio frequency (RF) gain, channel bandwidth, and a sampling rate. In the WiFi mode of operation, the bandwidth may be set to, for example, 20 MHz and the sampling rate may be set to 20 M complex samples per second. In attempting to process information in the WiFi format to provide the location tag with the components illustrated in FIG. 2, such a condition may increase processing load for the controller 210. To mitigate this issue, the controller 210 may take advantage of Beacon packets that are generally inserted in the WiFi based signal to reduce computational load of the controller 210. For example, the apparatus 200 may employ a timestamping (or time synchronization) operation which will be discussed in more detail in connection with FIG. 3.

It may be necessary to downconvert frequencies associated with LTE and WiFi. For example, high frequency signals, typically above 100 MHz may not be sampled directly due to technical limitations such as, for example, the circuitry not be fast enough. The electronics may be incapable of capturing analog signals that rapidly vary in time. For example, 100 MHz signals require capturing time intervals smaller than 10 nano seconds. Further, the captured analog signals may be quantized to typically 12 data bits (i.e., quantized to one of $2^{12}=4096$ threshold levels) which may be challenging at rates faster than 100 mega samples per second. Typically, the bandwidth of the signals at hand may be smaller than the highest frequency component of the signal. For example, a 20 MHz Wifi signal at channel 36 populates frequencies between 5170 MHz and 5190 MHz. Instead of sampling a bandwidth of 5190 MHz, the signal may be downconverted to Zero IF into a signal populating frequency between −10 and +10 MHz. This baseband signal may be sampled at a rate of 20 Mega complex samples per second. Thus, downconversion may solve both the issues associated with analog capture and digital conversion.

The apparatus 200 (i.e., the downconverter 204 may perpetually switch between LTE and WiFi. The transceiver 202 receives the LTE based information at, for example, 1.9 GHz or other suitable frequency. The transceiver 202 provides such information to the downconverter 204. In turn, the downconverter 204 (or the zero_IF 204) provides a baseband, either the LTE signal or the WiFi signal are each converted to baseband. When receiving and processing the current beacon packet in the WiFi mode, the next beacon packet epoch may be determined. In a time period between the reception of the current beacon packet at the apparatus 200 and the next beacon transmission (based on the beacon epoch), the apparatus 200 processes this small amount of data. This may require more time than real-time, given the CPU power on chip. If the received thread is cut, the downconverter 204 may, for example, continuously receive WiFi for at least one Beacon Interval of typically 102.4 ms and reacquire contact with beacon epochs of the access points 122 for example.

When the apparatus 200 is tuned to a WiFi band, it is generally desirable to bypass (or prevent) the dedicated modem 212 from receiving this information. Rather, it may be preferable for such received information in the WiFi mode to be transmitted directly to the memory 208 (i.e., for storage) to enable the controller 210 to access and process such information. For example, the downconverter 204 generates an output that is in the form of samples that are complex numbers called a complex envelop. This raw data may be fed to the dedicated modem 212 (e.g. an LTE modem) when an LTE based signal is received or to the memory 208 when the WiFi based signal is received. The controller 210 processes the data from the memory 208 after the memory 208 receives the raw data. To ensure that the above condition is met, particularly in relation to ensuring that the WiFi based samples are transmitted directly to the memory 208 and not to the dedicated modem 212, the apparatus 200 incorporates a bus 213 which may by nature facilitates read and write access to data on the bus to all attached devices. In this case, the bus 213 may be implemented as an AMBA bus to cause the samples received in the WiFi format to be transmitted directly to the memory 208 after being received and downconverted.

In general, code may be stored in memory 208 and/or the controller 210 that facilitates the bypass or prevents the WiFi based samples from being transmitted to the dedicated modem 212 (e.g., ensures the transmission of WiFi beacons to the memory 208 for access by the controller 210). Such code may be part of the code that may be stored in the controller 210 (and/or memory 208) and provides for a reprogramming of various hardware registers of the down converter 204 as noted above. The code, when executed by the controller 210 may engage (or program) the AMBA bus 213 (or other suitable variant thereof) to provide the WiFi based samples directly to the memory 208 and then to the controller 210 via the memory 208 to support locationing functionality. This aspect may negate the use of performing hardware change to the modem 202. For example, the reprogramming of the controller 210 may also enable the ADC 206 to transmit data as received on a WiFi signal directly to the memory 208 for access by the controller 210 as opposed to such data being delivered to the dedicated modem 212. The controller 210 reprograms the ADC 206 to change the address for the delivery of WiFi data from the dedicated modem 212 to an address for the memory 208. The controller 210 may then access the WiFi data from the memory 208 to process such information. The AMBA bus 213 is generally used for the limited purpose of calibration of the ADC 206 (i.e. when the apparatus 200 is in a calibration mode). However, an advantage recognized by the disclosed implementation is the utilization of the AMBA bus 213 to transfer real WiFi based data directly to the memory 208 for processing by the controller 210 to enable the apparatus 200 to function as a location tag. The AMBA bus 213 generally prevents the downconverter data samples from being transmitted to the dedicated modem 212.

Figure 3:
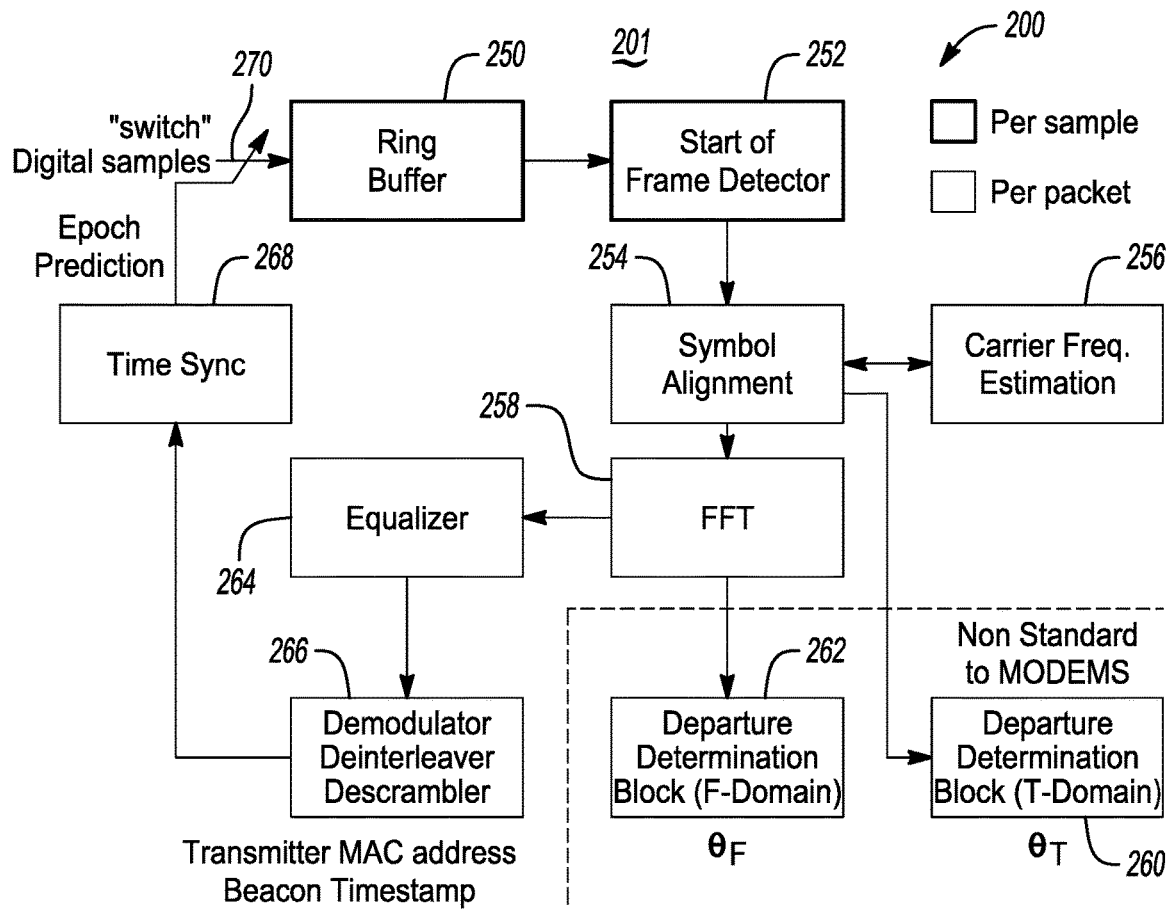
FIG. 3 depicts another aspect of the apparatus to provide wireless communication and the location tag accordance to one embodiment.

FIG. 3 depicts a signal flow of the apparatus 200 to provide wireless communication and the location tag in accordance to one embodiment. The apparatus 200 includes a ring buffer 250, a frame detector block 252, a symbol alignment block 254, a carrier frequency estimation block 256, a Fast Fourier Transform (FFT) block 258, a first departure determination block 260, a second departure determination block 262, an equalizer 264, a demodulator 266, a time synchronization block 268, and a soft switch 270. It is recognized that various suitable variations or implementations may be used in place of the foregoing disclosed components. The aspects illustrated in connection with the apparatus 200 as illustrated in FIG. 3 may be implemented in the modem 201. Specifically, any one or more of such components or blocks may be stored in the memory 208 and/or in the controller 210. The controller 210 may execute code representing the components and/or blocks as illustrated in FIG. 3. Additionally or alternatively, the controller 210 may process any one or more of the components and/or blocks with integrated hardware based logic circuitry. All of the operations performed by the components and/or blocks may be performed when the apparatus 200 (or modem 201) is in a passive power saving mode (PSM) (e.g., the apparatus 200 may sparsely be attached to the wireless medium for receiving and processing Beacon packets. The apparatus 200 does not go to sleep in the passive PSM. Rather, in the passive PSM, the apparatus 200 may selectively switch its transceiver 202 a predetermined number of times between on and off states to reduce computational power (or processing) while the controller 210 processes data to perform other functionality. For example, the controller 210 may gather data for 5 milliseconds and process it for up to 100.24 milliseconds, ignoring incoming data for 95.24 milliseconds. The controller 210 may only process a fraction of the received beacon interval and the controller 210 may not be able to process 100% of real time data flow (e.g., cycles between activating and deactivating WiFi connection to access point 122, 124, 126).

The ring buffer 250 may store digitized raw complex envelope data (e.g., after the downconverter 204 converts the received signal into baseband for WiFi processing (see FIG. 2)). The ring buffer 250 may manage the data and transmit the data to the frame detector block 252. Once the start of the transmission from the access point 122, 124, 126 is detected, the symbol alignment block 254 ascertains symbol boundaries in the received signal. In general, a frame (also called the packet) is a contiguous interval in time during which the transmitter (e.g., access point 122, 124, 126) transmits an entire message in accordance with the standard. Receivers (e.g. the apparatus 200) may attempt to receive the frame. The apparatus 200 may check the frame for errors and a frame may be deemed either correct or incorrect, as a whole. A symbol may be considered to be similar to a letter in the transmitter's alphabet. A message comprises letters, the frame comprises symbols. The duration of WiFi symbols may be, for example, 4 microseconds. The carrier frequency estimation block 256 ascertains the carrier frequency of the transmitted signal as received from the access point 122, 124, 126.

The FFT block 258 employs FFT on the signal since the signal is Inverse Fast Fourier Transform (IFFT) encoded in accordance to an orthogonal frequency-domain multiplexing (OFDM) scheme. The symbol alignment block 254 generally extracts, for example, 64 samples representing the received Long Training Field (LTF) from the buffered samples which is then fed to the first departure determination block 260. For example, according to the 802.11 standards (e.g., WiFi standards 802.11n and later) employing OFDM PHYs, data frames transmitted by access points 122, 124, 126 include a "Short Training Field" (STF) and a "Long Training Field" (LTF) in a preamble. Such fields encode predefined 64-bit sequences that are specified by the standards. The 802.11a/g standard defines a frame format that is now referred to as the "legacy" format in 802.11n and later, which includes a legacy (L) preamble with L-STF and L-LTF fields. The 802.11n standard defines a new format, known as "high-throughput" (HT), with HT-STF and HT-LTF fields. Access points operating in accordance with the 802.11n and later standards may transmit frames in either legacy mode, pure HT-mode ("greenfield"), or HT mixed mode whereby frames include both legacy and HT training fields. In general, the received LTF conveys or is indicative of the channel(s) transfer function or frequency that is used by the transmitter (e.g., the access point 122, 124, 126) to send data to the modem 201.

The first departure determination block 260 utilizes the received LTF information in the time domain to estimate transmitted signals angle of departure from the access points 122, 124, 126. The manner in which the first departure determination block 260 determines the angle of departure of the transmitted signal is set forth in the '315 patent and the '051 patent both of which are hereby incorporated by reference in their entirety. The apparatus 200 may utilize the transmitted signal angle of departure for providing locationing functionality in relation to the object that is attached to the apparatus 200. The second departure determination block 262 utilizes the LTF information in the frequency domain (i.e., in frequency bins) to locate the the transmitted signals angle of departure from the access points 122, 124, 126. The manner in which the second departure determination block 262 determines the transmitted signal angle of departure is also set forth in the '315 patent and the '051 patent. For example, upon receiving the signals from the transmitted L-LTF bins in the frequency domain case and L-LTF bins in the time domain case, from any one access point 122, 124, 126, the apparatus 200 may compute the phase difference between a first transmission path and a second transmission path. This difference is indicative of the angle of departure of the signals from access point 122, 124, 126.

The equalizer 264 may equalize the frequency bins being transmitted from the FFT block 258. For example, the equalizer 264 may resolve channel or frequency variation for the frequency bins. The demodulator 266 extracts information bytes from the equalizer 264 to obtain a Media Access Control (MAC) address (or the identity) of the particular access point 122, 124, 126 that sent the transmission and was ultimately received by the apparatus 200. The MAC address generally corresponds to a hardware identification number (or identifier) of the transmitting access points 122, 124, 126 which uniquely identifies the access points 122, 124, 126 on a given network. In this context, access points 122, 124, 126 may or may not be on the same network and their wired connectivity may not be relevant. Once the apparatus 200 has knowledge of the identity of the transmitting access point 122, 124, 126, it is possible to then monitor or predict when the next beacon is due for beacon packets (or beacon timestamps) from the transmitting access point 122, 124, 126 when such beacon packets are later transmitted to the apparatus 200. The demodulator 266 translates symbols into a finite-number information bytes, typically up to about 1500 bytes. The bytes sent early in the message conform with a strict header format, parsing the stream of bytes into a fixed mold of fields. One of the fields in the Institute of Electrical and Electronics Engineers (IEEE) 802.11 standard is the Transmitter address (TA), comprising six bytes, 48 bits. This number is globally unique, there are no two devices bearing the same address. Every beacon frame comprises this unique TA.

The demodulator 266 provides the MAC address and the beacon timestamp to the time synchronization block 268. The time synchronization block 268 may then activate the soft switch 270 to receive a new signal from the access point 122, 124, 126 based on the MAC address for the transmitting access point 122, 124, 126 and on a forecast or prediction of when the next signal (e.g., epoch prediction) will be transmitted based on the beacon timestamp that was previously received at the apparatus 200. Thus, the apparatus 200 may be time synchronized with the access point 122, 124, 126 to activate the transceiver 202 when the apparatus 200 predicts the next epoch to be received based on a previously received beacon packet. This aspect reduces processing load and may mitigate concerns over excess processing that may be attributed to the diversion aspect as noted in connection with FIG. 2.

In general, most computational power may be required to hunt for ('acquire') the next packet. If the epoch of the next interesting packet is highly predictable, the average computing resources may be substantially reduced when processing raw data in a narrow window in time or at around the epoch, while ignoring raw data outside the interval. Otherwise, the controller 210 may be required to process every raw sample. In this instance, the controller 210 may or may not be able to cope with this high workload. This condition may consume substantial amounts of battery power and CPU power (or controller power).

The WiFi protocol facilitates the reception of beacon packets and preferably nothing in between while the transceiver 202 (i.e., the apparatus 200) is in a "sleep mode". Thus, in passive PSM, the transceiver 202 is selectively deactivated until the next epoch beacon is available. The transceiver 202 may be alerted that interesting data is queued on the access point 122, 124, 126 via the soft switch 270. The beacon packets provide the alert in this instance using a Traffic Indication Map. As noted above, in the passive PSM, the transceiver 202 may be disabled or deactivated on the apparatus 200 or may be turned off for a large percentage of time, thus reducing CPU power (or controller 210 power) and power consumption substantially. However, it bears mentioning that components or blocks of the apparatus 200 as illustrated in FIG. 3 may operate at full speed (e.g., does not go to sleep) processing data only a fraction of 'real-time' in the passive PSM.

The predictability of beacon epochs may also facilitate channel scanning, whereby the electronics virtually goes to sleep, but in reality, switches to different channels, sensing networks off the associated channel. In general, the apparatus 200 may switch to an optimal access point 122, 124, 126 well in advance, as the apparatus 200 (or mobile device roams). The apparatus 200 utilizes scanning to gather location data from foreign access points that is spread across the useful spectrum. Generally speaking, all access points 122, 124, 126 may be considered foreign or unknown to the apparatus 200 initially. However, once their channel assignment is known to the apparatus 200, the apparatus 200 may support determining the location for a large number of access points that are potentially spread across the whole available spectrum.

Figure 4:
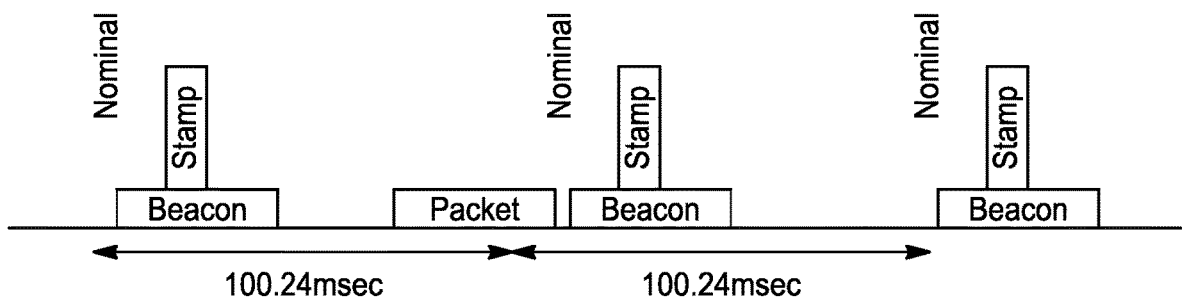
FIG. 4 corresponds to a plot provides a time interval between transmitted beacons from a wireless access point.

Beacon packets and probe response packets are time stamped by the transmitter (or access point) to advise the recipient or apparatus 200 about the epoch of future beacons (e.g., the transmission of a next beacon packet from the access point 122, 124, 126). In general, every beacon packet declares a 'Beacon Interval', which is a constant duration of time between adjacent Beacon transmissions in kilo-microseconds e.g. 1,024 µsec units of time (see FIG. 4). One setting may correspond to 100 units, e.g., 102.4 msec. Every beacon may be time stamped in transmitter hardware, indicating the actual beacon epoch. The transmission may be delayed beyond the nominal transmission epoch until the medium is free (not occupied). Further, the first beacon transmitted by the individual access point is mandated by the IEEE802.11 standard to be time stamped zero. The time stamp may be a 64-bit integer number of µsec. The time synchronization block 268 that receives the beacon packet may determine the nominal epoch of the current BeaconT_epoch=T_stamp−(T_stamp mod T_interval) in receiver time based on a given current beacon packet. In general, a next beacon nominal epoch corresponds to T_epoch+T_interval. Beacon packets may not predate their nominal time, beacons may be delayed due to channel occupancy, typically by up to, for example, 3 ms.

Figure 5:
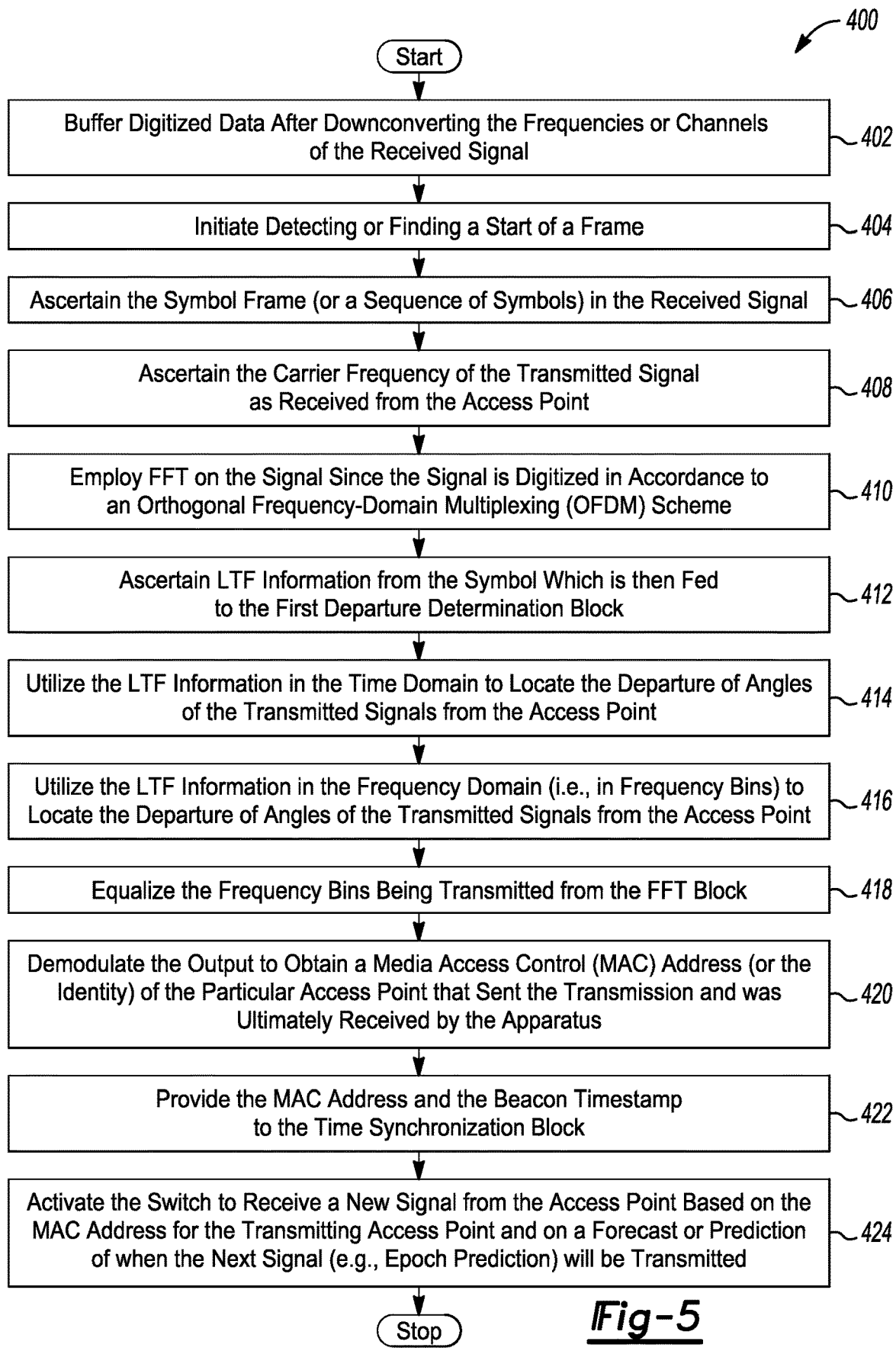
FIG. 5 depicts a method for wireless communication and for providing the location tag in accordance to one embodiment.

FIG. 5 depicts a method 400 for providing wireless communication and/or the location tag in accordance with one embodiment.

In operation 402, the ring buffer 250 may store digitized data (e.g., after the downconverter 204 converts the WiFi based signal into zero-IF, suitable for WiFi processing). As noted above, the downconverter 204 may perceptually switch between LTE and WiFi. Therefore, the downconverter 204 may also convert the frequency of the LTE based signal into a baseband for LTE based processing. This operation may be performed after the ADC 206 digitizes the analog information received from the downconverter 204 (see FIG. 2)).

In operation 404, the frame detector block 252 may initiate detecting or finding a start of a frame before the reception of the data from a corresponding access point 122, 124, 126.

In operation 406, once the start of the transmission from the access point 122, 124, 126 is known after operation 404 is performed, the symbol alignment block 254 ascertains the symbol frame (or a sequence of symbols) in the received signal within, for example, a few samples, typically 50 nsec.

In operation 408, the carrier frequency estimation block 256 may ascertain the carrier frequency of the received signal as transmitted by the access point 122, 124, 126.

In operation 410, the FFT block 258 employs FFT on the signal since the signal is encoded in accordance to an orthogonal frequency-domain multiplexing (OFDM) scheme.

In operation 412, the symbol alignment block 254 may ascertain symbol boundaries within one sample duration, typically 50 nsec, which is then fed to the first departure determination block 260. As noted above, according to the 802.11 (WiFi) standard employing OFDM PHYs, data frames transmitted by access points 122, 124, 126 include a preamble that includes the STF and the LTF. Such fields comprise predefined sequences of fixed, well known bits that are specified by the standard. Access points 122, 124, 126 operating in accordance with the 802.11n standard may transmit frames in in the legacy mode. In general, the LTF information conveys or is indicative of the channel(s) or frequency that is used by the transmitter (e.g., the access point 122, 124, 126) to send data to the modem 201.

In operation 414, the first departure determination block 260 may utilize the LTF information in time domain to estimate the transmitted signals angle of departure from the access points 122, 124, 126. The first departure determination block 260 determines the transmitted angle of departure signal from the access point 122, 124, 126 in time domain.

In operation 416, the second departure determination block 262 may utilize the LTF information in the frequency domain (i.e., in frequency bins) to estimate the departure angles of the received signals from the access points 122, 124, 126. The estimation of the departure angles is performed in frequency domain.

In operation 418, the equalizer 264 may equalize the frequency bins being provided by the FFT block 258. For example, the equalizer 264 may resolve channel imperfection due to multipath.

In operation 420, the demodulator 266 may extract information bytes from the equalizer 264 to obtain a Media Access Control (MAC) address (equivalent to the identity) of the particular access point 122, 124, 126 that sent the transmission and was ultimately received by the apparatus 200. The MAC address generally corresponds to a unique, hardware identification number of the transmitting access point 122, 124, 126 which globally identifies the access point 122, 124, 126. Once the apparatus 200 has knowledge of the identity of the transmitting access point 122, 124, 126, it is possible to then monitor or predict when the next beacon is due for beacon packets (or beacon timestamps) from the transmitting access point 122, 124, 126 when such beacon packets are later transmitted to the apparatus 200.

In operation 422, the demodulator 266 may provide the MAC address and the beacon timestamp to the time synchronization block 268.

In operation 424, the time synchronization block 268 may then activate the soft switch 270 to receive a new signal from the access point 122, 124, 126 based on the MAC address for the transmitting access point 122, 124, 126 and on a forecast or prediction of when the next signal (e.g., epoch prediction) will be transmitted based on the beacon timestamp that was previously received at the apparatus 200. Thus, the apparatus 200 may be time synchronized with the access point 122, 124, 126 to activate the transceiver 202 and task the controller 210 when the apparatus 200 predicts the next epoch to be received based on a previously received beacon packet. This aspect shall reduce processing load and may mitigate concerns over excess processing that may be attributed to the diversion aspect as noted in connection with FIG. 2. This feature also enables the LTF information to be transmitted (even for LTE based transmissions) to the first and second departure determination blocks 260, 262 so that the angle of departure may be obtaining for transmitting signals from access points 122, 124, 126. Thus, the apparatus 200 is capable of being implemented as a location tag to determine the location of a particular access point 122, 124, 126.

Figure 6:
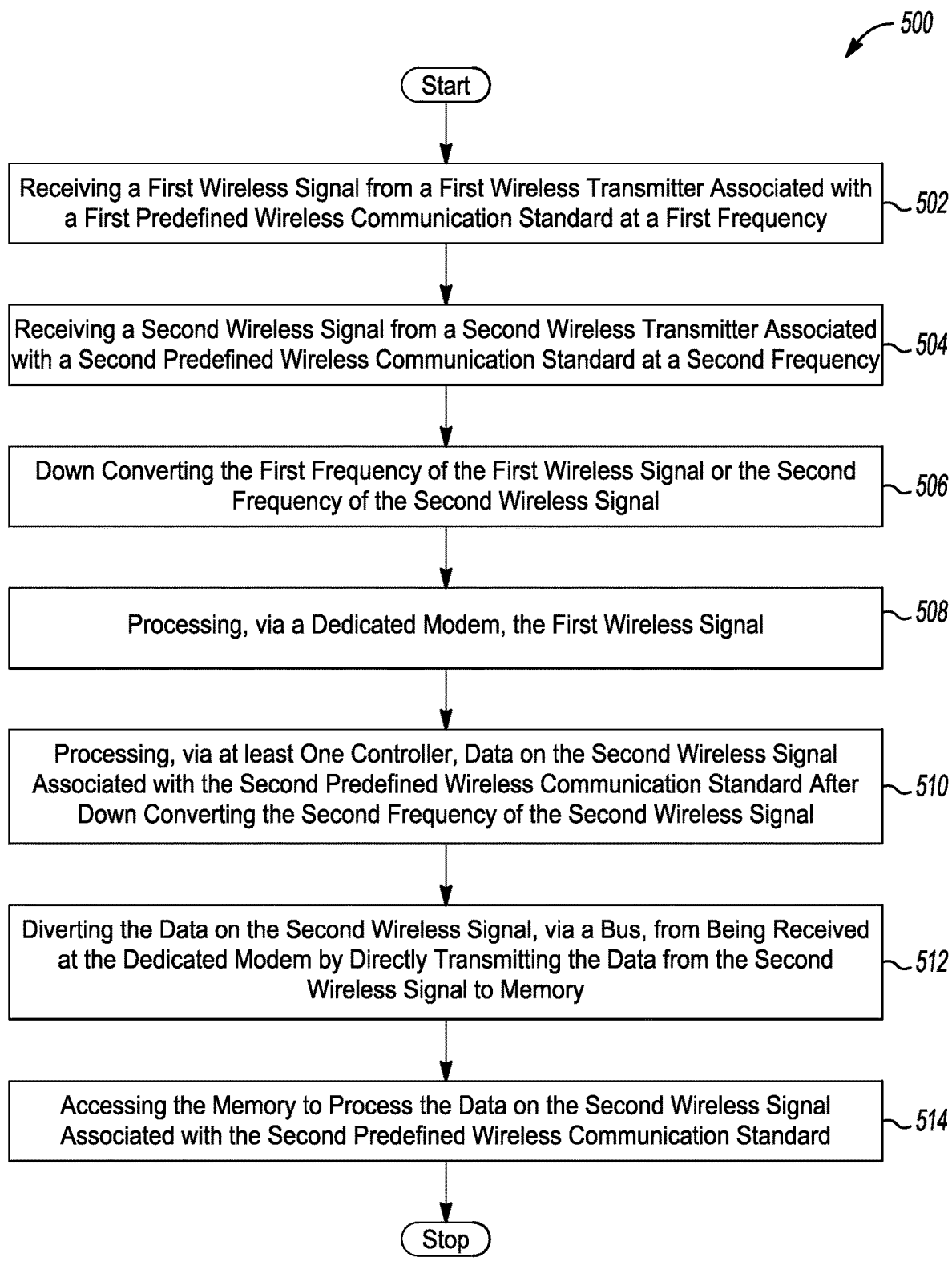
FIG. 6 depicts another method for wireless communication in accordance to one embodiment.

FIG. 6 depicts another method 500 for wireless communication in accordance to one embodiment.

In operation 502, a transceiver 202 for receiving a first wireless signal from a first wireless transmitter 122 associated with a first predefined wireless communication standard at a first frequency.

In operation 504, a transceiver 202 for receiving a second wireless signal from a second wireless transmitter 124 associated with a second predefined wireless communication standard at a second frequency.

In operation 506, a frequency converter (or downconverter 204) for down converting the first frequency of the first wireless signal or the second frequency of the second wireless signal.

In operation 508, the dedicated modem (or the dedicated modem chip 212) for processing the first wireless signal.

In operation 510, the at least one controller 210 for processing data on the second wireless signal associated with the second predefined wireless communication standard after down converting the second frequency of the second wireless signal.

In operation 512, the bus 213 for diverting the data on the second wireless signal from being received at the dedicated modem 212 by directly transmitting the data from the second wireless signal to memory 208.

In operation 514, the at least one controller 210 for accessing the memory 208 to process the data on the second wireless signal associated with the second predefined wireless communication standard.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for wireless communication, the apparatus comprising:
   a transceiver configured to receive a first wireless signal from a first wireless transmitter associated with a first predefined wireless communication standard at first frequency and to receive a second wireless signal from a second wireless transmitter associated with a second predefined wireless communication standard at a second frequency;
a dedicated modem being capable of processing the first wireless signal;
a frequency converter configured to down convert one of the first frequency of the first wireless signal or the second frequency of the second wireless signal;
at least one controller programmed to:
receive data on the second wireless signal; and
process the data on the second wireless signal associated with the second predefined wireless communication standard after down converting the second frequency of the second wireless signal; and
a bus configured to divert the data from the second wireless signal from being received at the dedicated modem by directly transmitting the data from the second wireless signal to memory, wherein the at least one controller is further programmed to access the memory for processing the data on the second wireless signal associated with the second predefined wireless communication standard,
wherein the at least one controller is further programmed to obtain a beacon timestamp on the second wireless signal in response to processing the second wireless signal associated with the second predefined wireless communication standard, and
wherein the at least one controller is further programmed to obtain a Media Access Control (MAC) address on the second wireless signal in response to processing the second wireless signal associated with the second predefined wireless communication standard after down-converting the second frequency of the second wireless signal, and wherein the MAC address provides an identifier for the second wireless transmitter that transmitted the second wireless signal.

2. The apparatus of claim 1, wherein the at least one controller is further programmed to determine an epoch prediction corresponding to a transmission time at which the second wireless transmitter transmits a next wireless signal based on the beacon timestamp.

3. The apparatus of claim 2, wherein the at least one controller is further programmed to activate the transceiver to receive the next wireless signal from the second wireless transmitter based on the epoch prediction and on the MAC address.

4. The apparatus of claim 3, wherein the at least one controller is further configured to deactivate the transceiver at a time interval that is between the receipt of the second wireless signal and the next wireless signal.

5. The apparatus of claim 1, wherein the bus is an Advanced Microcontroller Bus Architecture (AMBA) bus.

6. The apparatus of claim 1, wherein the first predefined wireless communication standard is a Long-Term Evolution (LTE) standard.

7. The apparatus of claim 6, wherein the second predefined wireless communication standard is an Institute of Electrical and Electronics Engineers (IEEE) 802.11-WiFi standard.

8. The apparatus of claim 1 is implemented in a first modem.

9. The apparatus of claim 8, wherein the first modem is implemented in a wireless location tag device that is configured to provide location information for an object that is coupled to the wireless location tag device.

10. A computer-program product embodied in a non-transitory computer readable medium that is programmed for wireless communication, the computer-program product comprising instructions to:
receive a first wireless signal from a first wireless transmitter associated with a first predefined wireless communication standard at first frequency;
receive a second wireless signal from a second wireless transmitter associated with a second predefined wireless communication standard at a second frequency;
down convert the first frequency of one of the first wireless signal or the second frequency of the second wireless signal;
process, via a dedicated modem, the first wireless signal;
process, via at least one controller, data on the second wireless signal associated with the second predefined wireless communication standard after down converting the second frequency of the second wireless signal;
divert the data on the second wireless signal, via a bus, from being received at the dedicated modem by directly transmitting the data from the second wireless signal to memory;
access the memory to process the data on the second wireless signal associated with the second predefined wireless communication standard;
obtain a beacon timestamp on the second wireless signal in response to processing the second wireless signal at the second frequency associated with the second predefined wireless communication standard; and
obtain a Media Access Control (MAC) address on the second wireless signal in response to processing the second wireless signal associated with the second predefined wireless communication standard, wherein the MAC address provides an identifier for the second wireless transmitter that transmitted the second wireless signal.

11. The computer-program product of claim 10 further comprising instructions to determine an epoch prediction corresponding to a transmission time in which the second wireless transmitter transmits a next wireless signal based on the beacon timestamp.

12. The computer-program product of claim 11 further comprising instructions to activate a transceiver to receive the next wireless signal from the second wireless transmitter based on the epoch prediction and on the MAC address.

13. The computer-program product of claim 12 further comprising instructions to avoid processing input samples from the second wireless transmitter at a time interval that is between the receipt of the second wireless signal and the next wireless signal.

14. The computer-program product of claim 10, wherein the first predefined wireless communication standard is a Long-Term Evolution (LTE) standard.

15. The computer-program product of claim 10, wherein the second predefined wireless communication standard is an Institute of Electrical and Electronics Engineers (IEEE) 802.11-WiFi standard.

16. A method for wireless communication comprising:
receiving a first wireless signal from a first wireless transmitter associated with a first predefined wireless communication standard at first frequency;
receiving a second wireless signal from a second wireless transmitter associated with a second predefined wireless communication standard at a second frequency;
down converting the first frequency of the first wireless signal or the second frequency of the second wireless signal;

processing, via a dedicated modem, the first wireless signal;

processing, via at least one controller, data on the second wireless signal associated with the second predefined wireless communication standard after down converting the second frequency of the second wireless signal;

diverting the data on the second wireless signal, via a bus, from being received at the dedicated modem by directly transmitting the data from the second wireless signal to memory;

accessing the memory to process the data on the second wireless signal associated with the second predefined wireless communication standard;

obtaining a beacon timestamp on the second wireless signal in response to processing the second wireless signal at the second frequency associated with the second predefined wireless communication standard; and obtaining a Media Access Control (MAC) address on the second wireless signal in response to processing the second wireless signal associated with the second predefined wireless communication standard, wherein the MAC address provides an identifier for the second wireless transmitter that transmitted the second wireless signal.

* * * * *